United States Patent [19]

Marriott et al.

[11] Patent Number: 4,772,638

[45] Date of Patent: Sep. 20, 1988

[54] COMPOSITIONS HAVING REDUCED SMOKE EMISSION

[75] Inventors: John C. Marriott, Kenilworth; Paul W. Law; Anthony J. Morris, both of Coventry, all of United Kingdom

[73] Assignee: Courtaulds PLC, London, United Kingdom

[21] Appl. No.: 136,366

[22] Filed: Dec. 22, 1987

[30] Foreign Application Priority Data

Dec. 23, 1986 [GB] United Kingdom ................. 8630713

[51] Int. Cl.⁴ .............................................. F09K 21/14
[52] U.S. Cl. .................... 521/120; 106/18.11; 252/609; 521/89; 521/90; 521/120; 521/121; 521/903; 523/179
[58] Field of Search ................... 521/89, 90, 120, 121, 521/903; 523/179

[56] References Cited

U.S. PATENT DOCUMENTS

| | | | |
|---|---|---|---|
| 2,719,125 | 9/1955 | Roberts | 252/46.7 |
| 2,719,126 | 9/1955 | Fields et al. | 252/47 |
| 2,983,716 | 5/1961 | Fields | 260/79.5 |
| 3,087,932 | 4/1963 | Little | 260/302 |
| 3,542,701 | 11/1970 | van Raamsdonk | 260/2.5 |
| 3,876,568 | 4/1975 | Wysocki | 260/2.5 AW |
| 3,933,694 | 1/1976 | Wysocki | 260/2.5 AW |
| 4,356,274 | 10/1982 | Sandler et al. | 521/120 |

Primary Examiner—Morton Foelak
Attorney, Agent, or Firm—Howson & Howson

[57] ABSTRACT

A smoke suppressant for reducing smoke emission when a flammable organic material is heated above its decomposition temperature or ignited comprises a liquid heterocyclic polysulphide compound having the formula $$R-S_x-Z-S_{x'}-R' \qquad (I)$$

where R is an organic group containing 1 to 12 carbon atoms, R' is hydrogen or an organic group containing 1 to 12 carbon atoms, x is at least 2, x' is 1 or more when R' is hydrogen and is at least 2 when R' is an organic group and Z is a divalent radical derived from a heterocyclic compound, preferably a sulphur-containing heterocyclic compound such as thiadiazole. The compound (I) may contain dissolved or dispersed elemental sulphur. The smoke suppressant is particularly suitable for use in polyurethane foams.

12 Claims, No Drawings

COMPOSITIONS HAVING REDUCED SMOKE EMISSION

This invention relates to compositions containing flammable organic materials but having reduced smoke emission when ignited or heated above their decomposition temperatures, and to smoke suppressants for use with such materials.

The invention is concerned in one aspect with reducing the smoke emitted from polyurethane foams when they are ignited or heated above their decomposition temperature, and the invention covers polyol compositions containing a smoke suppressant which reduces the smoke emitted from a polyurethane foam which is a reaction product of the polyol composition. Polyurethane foams are widely used for heat insulation, particularly in aircraft and refrigeration and in upholstery and mattresses, but they have the disadvantage that when ignited they emit a dense, choking smoke. This is a particular problem if the polyurethane foam is used in aircraft, since the smoke may reduce visibility to nil in an accident and hinder passengers escaping. Several suggestions have been made for additives which reduce smoke emission from polyurethane foams. U.S. Pat. No. 3,876,568 suggests the addition of elemental sulphur. U.S. Pat. No. 4,356,274 suggests the addition of a metal salt of a dialkyl dithiocarbamate, a mercaptobenzothiazole, a dimercaptothiadiazole, a mercaptotriazine, a hydroxy thiophenol or an aliphatic dimercapto compound. U.S. Pat. No. 3,933,694 suggests the addition of an organic sulphide or thiocarbonate.

Other flammable materials which can be treated according to the invention are cellulosic materials such as cardboard, paper, wood or wood particle board, and polymers such as polyvinyl chloride, nylon, and polyesters, particularly if in absorbent form such as foam or fabric.

A composition according to the invention which comprises a flammable organic material emits a reduced amount of smoke when ignited or heated above its decomposition temperature because the material contains a liquid heterocyclic polysulphide compound having the formula $$R-S_x-Z-S_{x'}-R' \quad (I)$$

where R is an organic group containing 1 to 12 carbon atoms, R' is hydrogen or an organic group containing 1 to 12 carbon atoms, x is at least 2, x' is 1 or more when R' is H and is at least 2 when R' is an organic group, and Z is a divalent radical derived from a heterocyclic compound.

The heterocyclic group Z in the compound of formula I preferably contains sulphur in a heterocyclic ring, for example a thiadiazole, thiophen or thiazole. The polysulphide groups are preferably bonded to a ring carbon atom of the heterocycle. Compounds in which the polysulphide groups are attached to the 2 and 5 positions of a 1,3,4-thiadiazole ring, i.e. compounds of the formula

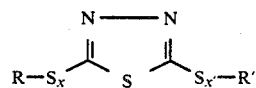

are particularly preferred. The groups R and R' will as a rule be linked to the sulphur atoms via carbon sulphur links and are preferably the same, preferably being alkyl groups having 1 to 4 carbon atoms. If the alkyl groups contain 3 or more carbon atoms they are preferably branched, for example isopropyl or t-butyl groups.

Such compounds are known as corrosion inhibitors in lubricants and for rubber vulcanisation. Their preparation is described in U.S. Pat. No. 3,087,932, 2,983,716 and 2,719,126. Compounds in which x and x' are each 2 can be prepared by the reaction of a dimercaptothiadiazole with sulphuryl chloride followed by a thiol RSH. Compounds in which x and x' are each 3 or 4 can be prepared by the reaction of a dimercaptothiadiazole with sulphur dichloride or sulphur monochloride together with a thiol. Compounds in which x and x' are 4 or more, for example 4 to 8, can be prepared by heating a dimercaptothiadiazole with sulphur in polymeric form and a thiol as set out below

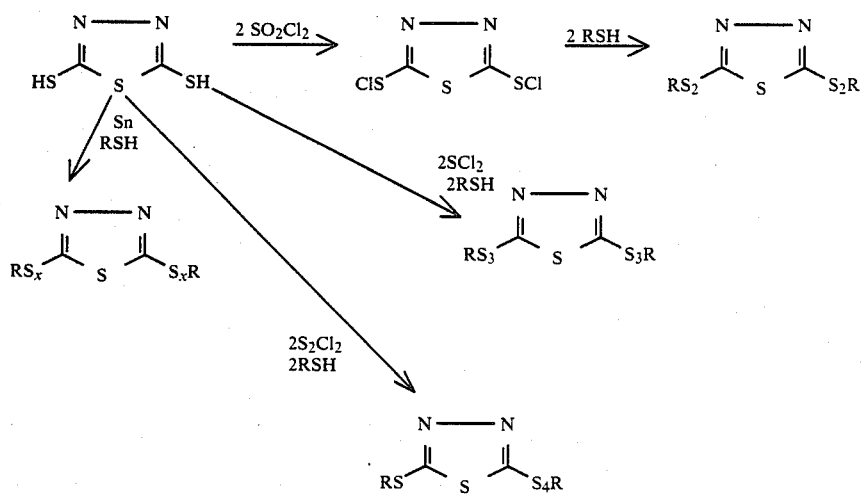

Dimercapto-1,3,4-thiadiazole is known and may be obtained by known methods. Compounds of formula (I) where R' is H and x' is 1, or mixtures thereof with the compounds where R' and x' are the same as R and x, can be obtained by the above reactions using a less than stoichiometric amount of the sulphur chloride and the thiol RSH. Such reactions, particularly when a less than stoichiometric amount of the thiol RSH is used, may form minor but significant amounts of heterocyclic polysulphide oligomers such as R—$S_x$—Z—$S_x$—Z—$S_{x'}$—R'. These heterocyclic polysulphide oligomers, or reaction mixtures containing them, can be used as the smoke suppressant compound of formula (I) provided they are liquid.

Dimercapto-thiophen, for example 2,3-,2,4- or 2,5-dimercaptothiophen, and dimercapto-thiazole, which are also known and can be obtained by known methods, undergo similar reaction. Other dimercapto heterocyclic compounds may be reacted in a similar manner to produce compounds of formula (I).

The compounds of formula (I) give a greater reduction in smoke output than the sulphides and thiocarbonates described in U.S. Pat. No. 3,933,694, for example the dialkyl disulphides. In general, the smoke output decreases as the sulphur content of the compound formula (I) increases. The compounds of formula (I) also retard the generation of smoke, which can be of great advantage in allowing easier escape from a fire, for example in an aircraft on the ground. The compounds of formula (I) are liquid and have the advantage over elemental sulphur and the salts described in U.S. Pat. No. 4,356,274 that they are more readily and uniformly dispersed in the ingredients used to make polyurethane foam and have less detrimental effect on foam formation.

Generally, polyurethanes are produced by the reaction of a di or poly-isocyanate compound with a polyfunctional hydroxy compound (polyol). In the production of flexible foams the polyol consists mainly of long chain polyether or polyester diols used with a low molecular weight diisocyanate. In the production of rigid foams a polyol of higher functionality, for example 3 to 6, is used with a higher molecular weight isocyanate, for example a compound containing 2 or more aromatic rings such as methylene bis(phenyl isocyanate) or oligomer thereof. To create a polyurethane foam requires a suitable catalyst system and surfactant, water and a blowing agent, all of which are well known in the art. It is usual for these additives to be incorporated into the polyol component prior to reaction with the isocyanate. The term 'polyurethne foam' as used herein includes urethane-modified polyisocyanurate foams formed by reacting a polyisocyanate with a less than stoichiometric amount of polyol in the presence of a catalyst for isocyanurate formation.

Some typical examples of polyurethane foams are described in E. N. Doyle, "The Development and Use of Polyurethane Products", McGraw - Hill Book Co., New York, 1971 and in W. C. Kuryla/ A. J. Pap "Flame Retardancy of Polymeric Materials" Volume 3, Marcel Dekker Inc., New York, 1975.

The polyurethane foams of this invention may also contain flame-retardants such as chloroalkylphosphates, phosphorus-nitrogen compounds and polyols containing phosphorus and/or halogen.

In a preferred method of incorporation, compounds of formula (I) are dispersed in either the isocyanate or polyol component before the polyurethane foam-forming reaction takes place. Incorporation into the polyol component is preferred. The level of addition of the compound of formula (I) to the polyol component is for example 1 to 100%, preferably 1 to 60%, by weight of the compound of formula (I) based on the weight of polyol.

The smoke suppressant of formula (I) can alternatively be applied to the organic flammable material by impregnation. Impregnation is preferably carried out using a solution of the liquid heterocyclic compound in a volatile organic solvent, for example a halogenated hydrocarbon solvent such as dichloromethane or 1,2-dichloroethane, an aromatic hydrocarbon such as toluene or a cyclic ether such as dioxan. The solvent should be inert to the flammable organic material. The smoke supressant is generally applied to cellulosic materials by impregnation, for example from a 5 to 50% by weight solution, and can be applied to open cell foams by impregnation, for example from a 0.2 to 5% by weight solution.

The amount of the compound of formula (I) incorporated in the final flammable organic material, whether by dispersion in one of the foam-forming reagents as described above for polyurethane foam, or by impregnation, is preferably 0.5 to 30%, particularly 0.5 to 20%, by weight.

According to another aspect of the invention a smoke suppressant composition for use in a flammable organic material comprises a compound of formula (I) having elemental sulphur dispersed or dissolved therein. The amount of sulphur is generally 1 to 10% by weight based on the compound of formula (I). Elemental sulphur may thereby be incorporated more uniformly and stably in a flammable material, for example polyol composition used to make polyurethane foam. The smoke suppressant effects of the compound of formula (I) and of the elemental sulphur augment each other in such a foam. Compounds of formula (I) in which R and R' are higher alkyl groups having 6 to 12 carbon atoms, for example 1,3,4-thiadiazole2,5-bis(nonyl disulphide), are the most effective solvents or dispersants for sulphur.

The invention is illustrated by the following Examples.

PREPARATION EXAMPLE A

Preparation of 1,3,4-Thiadiazole-2,5-bis(butyl tetra sulphide)

To a solution of 2,5-dimercapto -1,3,4- thiadiazole (30 g,0.2 mole) and tert-butylthiol, (36 g, 0.4 mole) in 1,4-dioxan (200 ml) is slowly added a solution of sulphur monochloride 55.3 g, 0.4 mole) in 1,4 dioxane (40 ml). Hydrogen chloride gas is evolved from the reaction mixture which is held at room temperature for one hour and then heated at 50° C. for a further 3 hours with continuous stirring.

The reaction product is washed in alkali and water and dried to give 76.5 g of a red oil (84% yield).
% S theoretical 63.4
% S actual 58.7

PREPARATION EXAMPLE B

Preparation of 1,3,4-Thiadiazole-2,5- bis(butyl trisulphide)

To a solution of 2,5-dimercapto-1,3,4-thiadiazole (30 g, 0. 2 mole) and tert-butylthiol (36 g, 0.4 mole) in 1,4-dioxan (200 ml) is slowly added a solution of sulphur dichloride (43 g, 0.4 mole) in 1,4-dioxane (40 ml). Hydrogen chloride gas is evolved from the reaction mixture and an exotherm is observed. After addition of the sulphur dichloride, the reaction mixture is maintained at 50° C. for a further 3 hours with stirring.

The reaction product is washed in alkali and water and dried to give 72.1 g of a red oil (92.4% yield)
% S theoretical=57.4
% S actual=53.7

EXAMPLES 1 TO 5

The rigid polyurethane foams described in the following Examples 1 to 5 were prepared as follows:

The smoke suppressant additive of formula (I) was stirred together with the polyol, tin and amine catalysts, surfactant, water, flame retardant and blowing agent in the proportions detailed in the formulation below. Based on the volume of the mould to be used (150×150×100 mm), a calculated amount of this mixture, constituting the polyol component, was stirred with the appropriate quantity of isocyanate based on the formulation below. The stirred reaction mixture was poured into the mould and the foam produced was aged for at least 48 hours. The foam was then cut into 3"×3"×½" (7.5×7.5×1.25 cm) specimens and burned in the NBS smoke chamber following the procedure laid down in ATM standard E662-79. The average maximum smoke density (DMC) under flaming conditions of 2 or more specimens is reported in Table 1 below.

| Formulation | Parts by weight |
|---|---|
| Polyol[a] | 100.0 |
| Dimethylethanolamine | 1.0 |
| Water | 1.0 |
| Surfactant[b] | 1.5 |
| Dibutyltindilaurate | 0.2 |
| Flame Retardant - (tris (chloropropyl) phosphate) | 10.0 |
| Blowing Agent (trichlorofluoromethane) | 37.0 |
| Isocyanate[c] | 126.0 |
| Smoke Suppressant of formula (I) | 20.0 |

References
[a]'Propylan RF154' (Lankro) - a sucrose and amine co-initiated polyalkylene oxide polyol
[b]'8408' (Goldschmidt) - a polysiloxane polyether copolymer
[c]'Suprasec DND' (I.C.I) - polymeric diphenylmethane diisocyanate of NCO equivalent 135.

TABLE 1

| Example | Smoke Suppressant of Formula (I) | | | Measure of % Sulphur in (I) | DMC | Delay of Smoke Release (in minutes) | % Reduction in smoke |
|---|---|---|---|---|---|---|---|
| Comparative Example | None | | | — | 64.4 | 0.0 | — |
| 1 | R = R' = t-nonyl | x = x' = 4 | | 43.4 | 41.1 | 0.2 | 36.2 |
| 2 | R = R' = isopropyl | x = x' = 2 | | 50.1 | 37.0 | 0.2 | 42.5 |
| 3 | R = R' = t-butyl | x = x' = 4 | | 58.7 | 28.3 | 0.2 | 56.1 |
| 4 | R = R' = t-butyl | x = x' = 3 | | 53.7 | 37.0 | 0.2 | 42.5 |
| 5 | R = R' = t-nonyl | x = x' = 2 | | 35.0 | 54.4 | 0.0 | 15.5 |

The comparative example shows a flame-retardant rigid polyurethane foam without a smoke suppressant produces a large quantity of smoke immediately upon flame application. Examples 1 to 5 show that rigid polyurethane foams of the same formulation as example 1 but containing a smoke suppressant of formula (I) produce less smoke and that smoke release is in most cases delayed and that the reduction in smoke is related to the level of sulphur in the compound of formula (I).

EXAMPLE 6

8.7 per cent by weight elemental sulphur was dissolved in 1,3,4-thiadiazole-2,5-bis(t-nonyldisulphide), which is the compound of formula (I) used in Example 5. This composition was then used as smoke suppressant in the preperation of a polyurethane foam according to Examples 1 to 5. The smoke emission (DMC) observed was 43.3, a 32.8% reduction compared to the comparative example.

EXAMPLES 7 AND 8

The process of Preparation Example A was repeated using 0.4 mole isopropylthiol in place of tert.-butylthiol. The liquid reaction product after washing and drying, consisting substantially of 1,3,4-thiadiazole-2-5-bis (isopropyltetrasulphide), was dissolved in dichloromethane at 10.9% by weight (Example 7) and 21.1% (Example 8).

Samples of cardboard (125 Kraft B flute) were impregnated by immersion in each solution and dried. The dried samples, and a comparative sample of cardboard immersed in dichloromethane alone, were tested in the NBS smoke chamber following the procedure of ATM E 662-79. The average maximum smoke density (DMC) and time to maximum smoke density (TDm) under non-flaming conditions of 2 or more specimens is reported in Table 2 below.

TABLE 2

| Example No. | % Smoke Suppressant | DMC | TDm | Reduction in Smoke |
|---|---|---|---|---|
| | 0 | 76.5 | 3.5 | — |
| 7 | 10.9 | 59.5 | 5.0 | 22.2% |
| 8 | 22.2 | 42.0 | 6.0 | 45.1% |

The % smoke suppressnat is the measured amount of the liquid heterocyclic sulphur compound based on the weight of untreated cardboard.

EXAMPLES 9 AND 10

The process of preparation Example B was repeated using 0.4 mole isopropylthiol in place of tert-butylthiol. The liquid reaction product after washing and drying, consisting substantially of 1,3,4-thiadiazole-2,5-bis (isopropyltrisulphide), was dissolved in dichloromethane at 0.5% by weight (Example 9) and 1.0% (Example 10)

Samples of flexible polyurethane foam derived from a polyether polyol (molecular weight 3500 and hydroxyl number 48) and toluene diisocyanate and containing 10% by weight 'Tolgand V6' chlorinated phosphate flame retardant were impregnated by immersion in each solution and dried. The dried samples, and a comparative sample of the foam impregnated with dichloromethane alone, were treated in the NBS smoke chamber under non-flaming conditions following the procedure of ASTM E 662-79. The results are reported in Table 3 below.

TABLE 3

| Example No. | % Smoke Suppressant | DMC | TDm | Reduction in Smoke |
|---|---|---|---|---|
| | 0 | 156.8 | 12.0 | — |
| 9 | 5.9 | 120.3 | 9.5 | 23.3% |

TABLE 3-continued

| Example No. | % Smoke Suppressant | DMC | TDm | Reduction in Smoke |
|---|---|---|---|---|
| 10 | 8.5 | 110.0 | 21.0 | 29.8% |

The % smoke suppressant is the measured amount of the liquid heterocyclic sulphur compound based on the weight of untreated foam.

What is claimed is:

1. A composition comprising a flammable organic material but having a reduced smoke emission when the organic material or a reaction product of the organic material is ignited or heated above its decomposition temperature, said composition containing, as smoke suppressant, a liquid heterocyclic polysulfide compound having the formula $$R-S_x-Z-S_{x'}-R' \qquad (I)$$

where R is an organic group containing 1 to 12 carbon atoms, R' is hydrogen or an organic group containing 1 to 12 carbon atoms, x is at least 2, x' is 1 or more when R' is hydrogen and is at least 2 when R' is an organic group and Z is a divalent radical derived from a heterocyclic compound, wherein said organic material is a synthetic organic foamed polymer.

2. A composition according to claim 1 in which said flammable organic material is a polyurethane foam.

3. A composition according to claim 2 in which said polyurethane foam contains 0.5 to 20 per cent by weight of said compound of formula (I).

4. A composition comprising a flammable organic material but having a reduced smoke emission when the organic material or a reaction product of the organic material is ignited or heated above its decomposition temperature, said composition containing, as smoke suppressant, a liquid heterocyclic polysulfide compound having the formula $$R-S_x-Z-S_{x'}-R' \qquad (I)$$

where R is an organic group containing 1 to 12 carbhon atoms, R' is hydrogen or an organic group containing 1 to 12 carbon atoms, x is at least 2, x' is 1 or more when R' is hydrogen and is at least 2 when R' is an organic group and Z is a divalent radical derived from a heterocyclic compound in which said flammable organic material is a polyol composition for use in the production of polyurethane foam.

5. A composition according to claim 4 in which said polyol composition contains 1 to 60 per cent by weight of said compound of formula (I) based on the weight of polyol.

6. A composition according to claim 1 or 4 in which the group Z in said compound of formula (I) includes a sulfurcontaining heterocyclic ring.

7. A composition according to claim 1 or 4 in which said liquid heterocyclic polysulfide compound has the formula

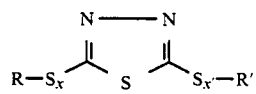

where R, R', x and x' are all as defined in claim 1.

8. A composition according to claim 1 or 4 in which the groups R and R' in said compound of formula (I) are both alkyl groups having 1 to 4 carbon atoms.

9. A composition according to claim 1 or 4 in which the groups R and R' in said compound of formula (I) are both branched alkyl groups.

10. A composition according to claim 1 or 4 in which, in said compound of formula (I), x is 2 to 4 and x' is 1 when R' is hydrogen or 2 to 4 when R' is an organic group.

11. A composition according to claim 7 in which said liquid heterocyclic polysulfide compound is the reaction product of 2,5-dimercapto-1,3,4-thiadiazole, a sulfur chloride selected from sulfur monochloride and sulfur dichloride, and an alkyl thiol.

12. A composition according to claim 1 or 4 in which from 1 to 10 per cent by weight of elemental sulfur, based on the weight of said heterocyclic polysulfide compound, is present dissolved or dispersed in said heterocyclic polysulfide compound.

* * * * *